United States Patent
Böldt et al.

(10) Patent No.: US 9,927,777 B2
(45) Date of Patent: Mar. 27, 2018

(54) METHOD AND APPARATUS FOR OPERATING A DOMESTIC APPLIANCE AND DOMESTIC APPLIANCE

(75) Inventors: Frank Böldt, Brieselang (DE); Jörg Großer, Bad Abbach (DE)

(73) Assignee: BSH Hausgeräte GmbH, Munich (DE)

(*) Notice: Subject to any disclaimer, the term of this patent is extended or adjusted under 35 U.S.C. 154(b) by 510 days.

(21) Appl. No.: 13/996,016

(22) PCT Filed: Dec. 15, 2011

(86) PCT No.: PCT/EP2011/072835
§ 371 (c)(1),
(2), (4) Date: Jun. 20, 2013

(87) PCT Pub. No.: WO2012/084663
PCT Pub. Date: Jun. 28, 2012

(65) Prior Publication Data
US 2013/0289753 A1    Oct. 31, 2013

(30) Foreign Application Priority Data
Dec. 21, 2010 (DE) .......... 10 2010 063 757

(51) Int. Cl.
*G05B 11/01* (2006.01)
*A47L 15/00* (2006.01)
(Continued)

(52) U.S. Cl.
CPC .......... *G05B 11/01* (2013.01); *A47L 15/0047* (2013.01); *H02J 3/14* (2013.01);
(Continued)

(58) Field of Classification Search
CPC ...................................... G05B 11/01
(Continued)

(56) References Cited

U.S. PATENT DOCUMENTS

| | | | |
|---|---|---|---|
| 6,169,964 B1* | 1/2001 | Aisa | A47L 15/0047 |
| | | | 700/291 |
| 7,423,546 B1* | 9/2008 | Aisa | H02J 13/0086 |
| | | | 340/635 |

(Continued)

FOREIGN PATENT DOCUMENTS

| | | |
|---|---|---|
| CN | 101425689 A | 5/2009 |
| DE | 4446883 A1 | 7/1996 |

(Continued)

OTHER PUBLICATIONS

Report of Examination CN 201180061139.1 dated Oct. 31, 2014.

(Continued)

*Primary Examiner* — Christopher E Everett
(74) *Attorney, Agent, or Firm* — Nixon & Vanderhye PC (57) ABSTRACT

A method for operating a domestic appliance to reduce consumption of one or more operating resources includes receiving data about a temporal cost profile of the operating resources, having a first time interval with low costs and a second time interval with high costs, comparing a operating time period with the first time interval and determining a point in time for starting operation as a function of a result of the comparison, when the operating time period is longer than the first time interval, determining a temporal program segment with a higher consumption than other program segments based on a temporal consumption profile that describes consumption as a function of time during operation, and determining the point in time for starting the operation such that the program segment with the higher consumption falls within the first time interval.

20 Claims, 2 Drawing Sheets (51) Int. Cl.
*H02J 3/14* (2006.01)
*D06F 58/28* (2006.01)
*D06F 33/02* (2006.01)

(52) U.S. Cl.
CPC ....... *A47L 2401/34* (2013.01); *A47L 2501/28* (2013.01); *D06F 33/02* (2013.01); *D06F 58/28* (2013.01); *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
USPC .......................................................... 700/90
See application file for complete search history.

(56) References Cited

U.S. PATENT DOCUMENTS

| | | | | |
|---|---|---|---|---|
| 7,787,964 | B2* | 8/2010 | Schuette | A47L 15/4293 340/679 |
| 8,617,316 | B2* | 12/2013 | Finch | G06Q 50/06 134/18 |
| 2003/0178894 | A1* | 9/2003 | Ghent | D06F 33/02 307/140 |
| 2005/0116836 | A1* | 6/2005 | Perry | H04Q 9/00 340/870.02 |
| 2006/0276938 | A1 | 12/2006 | Miller | |
| 2008/0015742 | A1 | 1/2008 | Kulyk et al. | |
| 2009/0272153 | A1 | 11/2009 | Kaltofen | |
| 2010/0146712 | A1* | 6/2010 | Finch | G06Q 50/06 8/137 |
| 2011/0088415 | A1* | 4/2011 | Lacey | F25B 47/02 62/80 |
| 2011/0191220 | A1* | 8/2011 | Kidston | G06Q 30/04 705/34 |
| 2012/0095606 | A1* | 4/2012 | Besore | A47L 15/0047 700/291 |
| 2012/0095609 | A1* | 4/2012 | Wetzel | G06Q 50/06 700/296 |

FOREIGN PATENT DOCUMENTS

| | | |
|---|---|---|
| DE | 10056494 A1 | 5/2002 |
| EP | 0727668 A1 | 8/1996 |
| GB | 2416852 A | 2/2006 |
| RU | 2249287 C2 | 3/2005 |
| RU | 2338310 C1 | 11/2008 |
| WO | 2005059454 A1 | 6/2005 |

OTHER PUBLICATIONS

International Search Report PCT/EP2011/072835 dated Mar. 22, 2012.
National Search Report DE 10 2010 063 757.2 dated Jun. 10, 2011.
Granting Decision RU 2013130382/07 dated Apr. 20, 2015.

\* cited by examiner

METHOD AND APPARATUS FOR OPERATING A DOMESTIC APPLIANCE AND DOMESTIC APPLIANCE

BACKGROUND OF THE INVENTION

The invention relates to a method for operating a domestic appliance. For at least one operating resource data containing information about a temporal cost profile of the operating resource is received, comprising at least a first time interval with low costs and a second time interval with high costs for the operating resource. A time period of operation of the domestic appliance is compared with the first time interval, in which the costs of the operating resource are low. A time point for the start of operation is determined as a function of the result of said comparison. The invention also relates to a control facility for operating a domestic appliance, which is configured to implement such a method. Finally the invention relates to a domestic appliance having such a control facility.

It is normal for households to have a number of domestic appliances running at the same time, for example a washing machine, dishwasher, tumble dryer and refrigeration appliance. If the domestic appliances run through the respective programs without taking account of the other domestic appliances, a maximum permissible power consumption in the household or in a larger electricity system segment can be exceeded or load peaks can be generated which overload the electricity supply system. This happens for example when high power consumers in different domestic appliances are activated at the same time. Such high power consumers can be for example a heater, an electric motor and a compressor.

So-called intelligent power supply systems or smart grids provide a remedy for uneven load distribution. Such intelligent power supply systems therefore ensure even load distribution in a specified electricity system segment, whether by means of corresponding control commands to electrical appliances or by transmitting information about the temporal profile of energy prices. Energy suppliers are or will be required to offer transparent and flexible tariffs. A domestic appliance can therefore receive data—for example by way of the internet—containing information about the temporal profile of prices for electrical energy (or a different operating resource), in other words information about a temporal cost profile for electrical energy. The domestic appliance can use such information so that for example operation of the domestic appliance is only initiated at a time point when the costs of electrical energy are at their lowest. Such an intelligent procedure can not only relieve the load on the power supply system at certain times of day but it can also reduce costs.

The present invention is based essentially on the subject matter according to publication US 2003/0178894 A1. This document describes a method for controlling the power consumption of an electrical domestic appliance. The domestic appliance receives data containing information about the temporal distribution of the costs of electrical energy. This temporal distribution includes both a time interval with low energy costs and a time interval with high energy costs. Operation of the domestic appliance can only be started when the instantaneous or current time point lies within the low cost time interval. The duration of this time interval is also compared with the time period of operation. Operation is only started on condition that the time period of operation is shorter than the duration of the cited time interval. The method described in the document US 2003/0178894 A1 therefore has the disadvantage that there may be situations in which the time period of operation of the domestic appliance is longer than the duration of the low cost energy time interval. In such instances operation of the domestic appliance cannot be initiated and the domestic appliance does not carry out its actual function.

A washing machine is known from the publication DE 10 2005 055 648 A1, which is configured to prepare hot water. The washing machine contains a water storage unit, which is connected to an external water supply. A control unit controls a process for preparing hot water and communicates with an external unit, which supplies information about energy costs for operation of the washing machine. The process for preparing hot water is activated as a function of the information supplied, specifically when energy costs for operating the washing machine are at their lowest during the course of the day.

An appliance system comprising a plurality of intercommunicating domestic appliances is known from the publication EP 0 727 668 A1. The domestic appliances communicate with one another by way of a communication bus. An overall power consumed by the domestic appliances is measured by a measuring device. The measuring device sends data by way of the communication bus containing information about the current overall power in each instance. Each domestic appliance can tap the same data at the communication bus and set its own power consumption taking into account the information contained in the data. The domestic appliances compare the momentary overall power in each instance with a predetermined limit value. If the overall power exceeds the predetermined limit value, the domestic appliances reduce their power consumption.

In the subject matter according to publication DE 44 46 883 A1 an operator is assisted with the operation of a washing machine in that a distinctive signal is output when a predetermined temperature setting—e.g. 95° C.—is selected. Such a signal informs the operator that the washing process uses a great deal of energy when the selected temperature setting is applied.

A measuring and display device which can be used to measure the power consumption of a domestic appliance is known from the publication GB 2 416 852 A. The measuring and display device comprises a screen, on which the instantaneous power consumption of the domestic appliance is displayed in each instance. The costs of the electrical energy consumed can also be displayed on the screen. The measuring and display device can interrupt operation of the domestic appliance by decoupling the domestic appliance from a supply system when energy costs exceed a predetermined threshold. The measuring and display device can also be integrated in a domestic appliance, specifically in a plug-type facility of the domestic appliance.

The publication US 2008/0015742 A1 describes a system consisting of a plurality of domestic appliances. An apparatus is assigned to each domestic appliance, which serves to generate appliance-specific state data for the respective domestic appliance. Each domestic appliance therefore generates its own state data and transmits said state data to the other domestic appliances. Each domestic appliance also receives the state data of the other domestic appliances. The apparatus processes such state data of its own domestic appliance and the received state data; it then decides—independently of other domestic appliances—whether or not its own domestic appliance is to be brought into operation. The state data includes for example information about the quantity of electrical energy required.

It is known from the publication DE 697 28 496 T2 that the energy consumption of a domestic appliance can be displayed by means of a display facility. Energy consumption can be predicted and displayed on a screen. During a wash process of the washing machine the momentary power consumption in each instance or a total energy consumption of the washing machine is also displayed.

WO 2005/059454 describes a method for defrosting a refrigerator at low cost. With this method information about a low tariff time interval is received from the supplier. It is checked whether an impending defrost operation can be displaced within a tolerance range so that the defrost operation starts in the low tariff time interval. If this is not possible, the defrost operation is still started without consideration of the instantaneously applicable tariff.

BRIEF SUMMARY OF THE INVENTION

The object of the invention is to demonstrate a solution as to how, with a method of the type mentioned in the introduction or based on the document US 2003/0178894 A1, the costs of the at least one operating resource can be saved and the load on the electrical power supply system can be relieved and also operation of the domestic appliance can be started as quickly as possible and brought to a complete conclusion.

An inventive method serves to operate a domestic appliance. For at least one operating resource data containing information about a temporal cost profile of the operating resource is received, comprising at least a first time interval with low costs and a second time interval with high costs for the operating resource. A time period of operation of the domestic appliance (for example after selection of a specified operating program by an operator or during the application of said operating program) is compared with the duration of the first time interval. A time point for the start of operation is then determined as a function of the result of said comparison. The time point for the start is determined as follows: if the time period of operation is longer than the first time interval, a temporal program segment with higher consumption of the operating resource than other program segments of operation is determined, specifically based on a temporal consumption profile, which describes consumption of the operating resource by the domestic appliance (as a function of time) during operation. The time point for the start of operation is determined so that the program segment with high consumption of the operating resource falls within the first time interval, in other words within the low cost time interval for the operating resource.

In contrast to the subject matter of publication US 2003/0178894 A1 operation of the domestic appliance can thus be started even if the time period of operation is longer than that of the low cost time interval for the operating resource. This allows savings to be made with electrical energy as the program segments with intensive energy consumption fall within the time segments with a favorable tariff. Operation of the domestic appliance can also be initiated quickly and can therefore be brought rapidly to a proper conclusion. The operator therefore does not have to wait for a longer low cost time interval, so that the desired operation of the domestic appliance is initiated and concluded. The time point for the start of operation can be determined taking into account the temporal consumption profile of the domestic appliance and taking into account the cost profile of the operating resource for example so that the costs of the entire operation for the at least one operating resource are at their lowest. This can be achieved if the program segments of operation, in which the greatest quantity of the operating resource is consumed, fall within the first time interval.

A domestic appliance here refers to an appliance used for household management. It can be a large domestic appliance, for example a washing machine, tumble dryer, dishwasher, cooker, extractor hood, refrigeration appliance, combined fridge-freezer or an air conditioning unit. However it can also be a small domestic appliance, for example an automatic coffee maker or a food processor. The domestic appliance in particular refers to an appliance which has at least one high power consumer, in other words an electrical consumer the power consumption of which exceeds for example 200 watts or 300 watts or 400 watts or 500 watts.

The cost profile of the operating resource here refers in particular to a temporal distribution of the costs of the operating resource as a function of time, for example during the course of the day. Such information can be sent by an energy supplier, for example via a so-called smart meter. This can take place in such a manner for example that the information is sent in the form of relative price information, for example "favorable in three hours". The information can also describe a tariff profile for a specified time period—for example the next 24 hours. The price information can also be supplied with a specified accuracy, for example with a 15 minute time resolution. A control device that is separate from the domestic appliance—for example a smart meter—can also be provided, receiving data relating to the cost profile from a resource provider. Such data can then be forwarded to the domestic appliance or the external control device can itself determine the time point for the start of operation and output control commands to the domestic appliance.

The consumption profile describes consumption of the operating resource by the domestic appliance as a function of time during operation for the application of a specified operating program. It is known that a plurality of operating programs can be provided or stored in the domestic appliance; such a consumption profile can be provided for every operating program, describing the consumption of the operating resource by the domestic appliance during operation for the application of the respective operating program. Such a consumption profile can also be recalculated as a function of the situation after any selection of the operating program by the user, so that any additional functions selected for the operating program can also be taken into account. If the time point for the start of operation is determined by an external control device separate from the domestic appliance—for example a smart meter—this control device can also receive data relating to the consumption profile by way of the internet or directly from the domestic appliance.

In one embodiment the operating resource is for example electrical energy and/or water. Data containing information about the temporal cost profile of electrical energy and/or water as the operating resource is then received and in this instance the consumption profile describes the consumption of electrical energy and/or water by the domestic appliance as a function of time during operation. It is thus possible to save electrical energy and/or water; it is also possible to relieve the load on the electrical power supply system and/or a water supply system.

As far as the determination of the time point for the start of operation is concerned, there are essentially two alternatives. On the one hand it can be an internal control facility of the domestic appliance which sets the time point for the start of operation. One advantage of an internal control facility is that no further components are required apart from the domestic appliance, so the domestic appliance does not require an additional separate control device. On the other hand the time point, as mentioned above, can also be determined by a control device that is separate from the domestic appliance, for example a smart meter. Such a control device can then communicate both with the domestic appliance and with a provider of the operating resource, specifically with an external computation facility of the provider. On the one hand the control device can thus receive data containing information about the temporal cost profile; on the other hand it can also receive data relating to the consumption profile of the domestic appliance. A separate control device has the advantage that such a control device can also control the operation of further domestic appliances; specifically a plurality of domestic appliances can communicate with such a central control device.

The time point for the start of operation of the domestic appliance is thus set. Provision can be made on the one hand for this time point to be output as a proposal with the aid of an output facility. The operator can then decide whether or not to accept this proposal. The operator can also determine another time point that is more favorable for him/her and bring the domestic appliance into operation at this other time point. Provision can be made on the other hand for operation to be initiated automatically at the specified time point without user intervention, for example by means of a control facility of the domestic appliance or based on control commands from an external control device. This can take place in such a manner that the operator selects a specified operating program for operation of the domestic appliance and the internal control facility or the external control device then determines the most favorable time point for the start of operation and initiates operation of the domestic appliance automatically at this time point without the operator having to start operation him/herself.

As mentioned above, the time point for the start of operation can be set so that the costs of the entire operation are at their lowest for the operating resource. In one embodiment provision is made for the time point for the start of operation to be determined according to predetermined criteria both in respect of the costs of the entire operation for the at least one operating resource and also in respect of a time period between a current time point and the start of operation. The time point for the start of operation can thus be set both as a function of the costs of the operating resource and also taking into account the time period until the start of operation. On the one hand costs are saved; on the other hand operation is initiated as early as possible so that a compromise can be reached between costs and waiting time. The predetermined criteria can include a wide range of scenarios. For example a limit value can be set both for costs and for the time period until the start of operation and the time point for the start can be set so that neither the costs nor the time period until the start exceed(s) the respective limit value. These limit values can also be different for costs and for the time period until the start. For example a relatively low limit value is predefined for costs, while for the time period until the start a relatively high limit value can be determined. Provision can also be made for a sum of costs and the time period until the start to be calculated and the time point for the start to be determined so that. this sum does not exceed a limit value. This means that costs are saved and operation can be initiated and concluded relatively quickly.

In one embodiment an input is received by means of which an operating program for operation is selected from a plurality of possible operating programs. This input can be performed by the operator at an operating facility of the domestic appliance. If the time period of operation is longer than the first time interval—in other words the low cost time interval for the operating resource—an operating program can be proposed, which is shorter in duration than the selected program and in some instances more intensive in its consumption of the operating resource. If operation with the selected operating program is longer than the first time interval, another operating program (turbo program) can be proposed instead of the selected operating program—for example by a control facility of the domestic appliance or an external control device. This may consume more energy but it is much shorter than the selected operating program and therefore fits completely within the first time interval. The operator can therefore operate the domestic appliance at the most favorable price and the load on the electrical power supply system can be relieved. Provision can however also be made for an alternative (turbo) program to be provided for at least one operating program stored in the domestic appliance—in particular for every operating program—being shorter in duration and in some instances more intensive in its consumption of operating resources than the assigned standard operating program.

The abovementioned turbo program is preferably only proposed when on the one hand the first time interval starts relatively soon—for example within a predetermined time period from the current time point—and on the other hand the duration of the first time interval is not too much shorter than the time period of operation with the selected operating program, in other words when the duration of the first time interval is longer than a predefined limit value. If the first low cost time interval is so far in the future that it does not start within a predefined time period from the current time point and/or the duration of the first time interval is shorter than a limit value, an operating program (ECO program) can also be proposed, which is more sparing in its consumption of the operating resource than the selected operating program and in some instances is longer in duration. It may therefore be favorable both for the operator and for the provider of the operating resource if instead of the selected operating program another ECO operating program is proposed during the second high cost time interval, which takes longer but consumes fewer operating resources. In the case of a wash program for example an automatic soak operation could be introduced beforehand so that a heating phase with a low temperature would suffice. The energy supplier can thus avoid any overloading of the power supply system and the provision of additional energy generation capacity and the operator generally operates the domestic appliance at a favorable price. Provision can be made for an alternative ECO program to be provided for at least one operating program stored in the domestic appliance—in particular for every operating program—being more sparing in its consumption of the operating resource and in some instances also longer.

The selection of an operating program by the operator also includes the instance where the operator only predefines a target and/or basic conditions, from which a proposal is then made for an operating program, specifically taking into account the costs of the operating resource and system utilization. In the case of a washing machine the operator could be asked for example to supply at least one of the following details: "Nature of textiles", in other words the type of material (e.g. cotton) and/or the type of laundry item (bedding, jeans, etc.), and/or "Color sensitivity yes/no" and or "Degree of soiling" and/or "Stains? If so, what sort?" and the like. Such inputs can be received by a control facility of the domestic appliance, which then uses said information to generate a proposal for the operating program based on the current energy system situation.

In one embodiment the domestic appliance sends data to an external device, specifically for example to an external control device—for example a smart meter—and/or to a computation facility of a provider of the operating resource. To this end the domestic appliance can have a corresponding communication interface, by way of which the data is sent to the external device. If the time point for the start of operation is determined by an external control device, this control device can also transmit said data to a computation facility of the provider of the operating resource. The data can contain for example the following information:

information about the temporal consumption profile of the domestic appliance and/or information about the time point for the start of operation and/or information about the time period of operation.

When this information is sent to an energy supplier, said supplier can respond to expected load peaks taking into account such information. Power plants could therefore be phased up or down for certain times of day based on expected system load. A different load distribution could however also be ensured by for example setting new tariff profiles and sending them to the domestic appliance and/or the external control device. The domestic appliance and/or the control device could then process the new tariff profiles or cost profiles so that operation of the domestic appliance or individual program segments is/are automatically moved. The domestic appliance can also be deactivated for a specified time period so that the expected load in the household or another system segment is sufficiently small again.

According to the invention an apparatus is also provided for operating a domestic appliance. It comprises means for receiving data containing information about a temporal cost profile of an operating resource, which comprises at least a first time interval with low costs and a second time interval with high costs for the operating resource. The apparatus also comprises means for comparing a time period of operation of the domestic appliance with the first time interval and means for determining a time point for the start of operation as a function of the result of the comparison. Means are also provided which, if the time period of operation is longer than the first time interval, determine a temporal program segment with higher consumption of the operating resource than other program segments based on a temporal consumption profile which describes consumption of the operating resource by the domestic appliance during operation. The apparatus also comprises means for determining the time point for the start so that the program segment with high operating resource consumption falls within the first time interval.

An inventive domestic appliance contains an inventive apparatus.

The preferred embodiments proposed in respect of the inventive method and their advantages apply correspondingly to the inventive apparatus and the inventive domestic appliance.

Further features of the invention will emerge from the claims, figures and description of the figures. All the features and feature combinations cited above in the description and the features and feature combinations cited below in the description of the figures and/or shown in the figures alone can be used not only in the respectively specified combination but also in other combinations or alone.

BRIEF DESCRIPTION OF THE DRAWINGS

The invention is described in more detail below based on individual preferred exemplary embodiments and with reference to the accompanying drawings, in which.

DETAILED DESCRIPTION OF EXEMPLARY EMBODIMENTS OF THE PRESENT INVENTION

Figure 1:
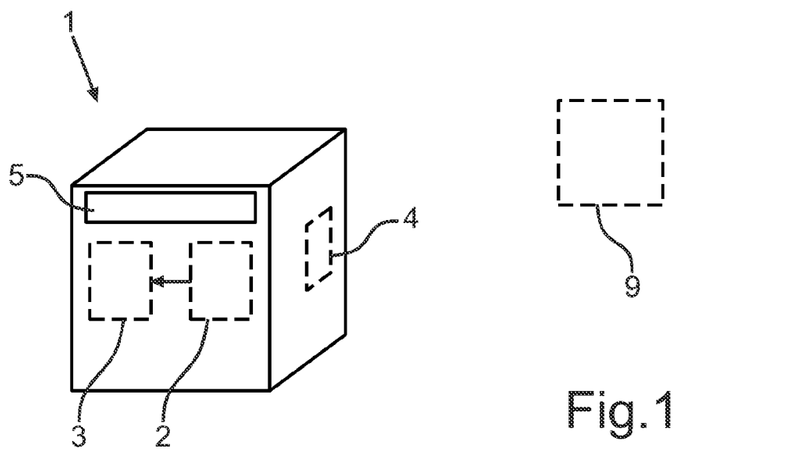
FIG. 1 shows a schematic diagram of a domestic appliance having an apparatus according to one embodiment of the invention.

FIG. 1 shows a schematic diagram of a domestic appliance 1, which can be a washing machine or tumble dryer for example. It contains a control facility 2, which is an apparatus according to one embodiment of the invention or a component of the apparatus. The control facility 2 serves to control operating processes of the domestic appliance 1. For example the control facility 2 activates an electrical consumer 3, for example an electric drive motor for a laundry drum.

The domestic appliance 1 also comprises a communication interface 4, by way of which the control facility 2 can communicate or exchange data with external facilities. The domestic appliance 1 also has an operating panel 5, which functions both as a display facility and as an input facility. The operating panel 5 can comprise for example operating elements and a screen.

Figure 2:
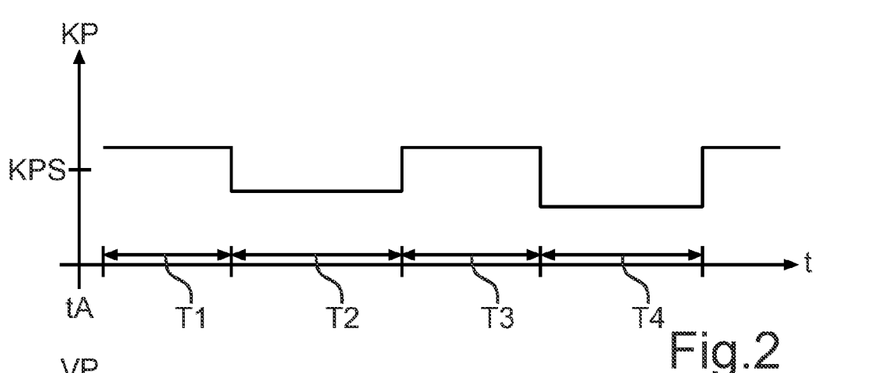
FIG. 2 shows an exemplary temporal cost profile of an operating resource.

The control facility 2 can receive data by way of the communication interface 4, said data containing information about a temporal cost profile of an operating resource, specifically in particular a temporal cost profile for electrical energy. An example of such a cost profile KP is shown in FIG. 2. The cost profile KP is a profile of the price of electrical energy over time t. As shown in FIG. 2 the cost profile KP includes different time intervals T1, T2, T3, T4, each with a different electrical energy price. While in time intervals T1 and T3 electrical energy costs are relatively high, the energy price is lower in time intervals T2 and T4. In time interval T4 the price is even a little lower than in time interval T2. A threshold value KPS can also be defined. The time intervals T1, T3 in which energy costs are higher than the threshold value KPS can be interpreted by the control facility 2 as high cost time intervals. In contrast the time intervals T2, T4 in which the costs are lower than the threshold value KPS can be interpreted as low cost time intervals.

Figure 3:
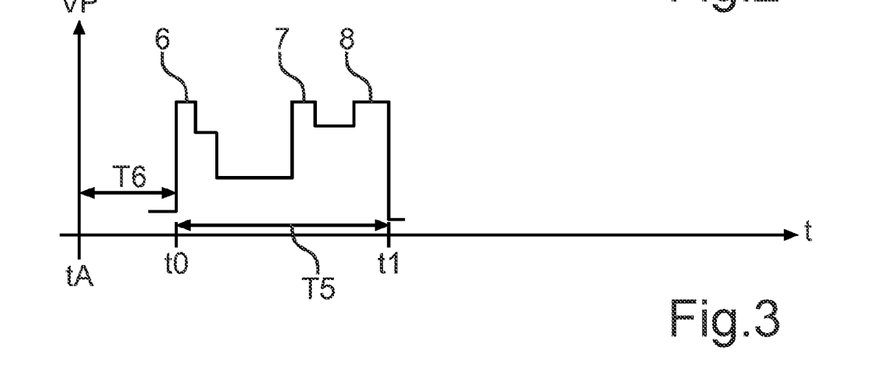
FIG. 3 shows an exemplary temporal consumption profile of the domestic appliance.

A plurality of operating programs and a plurality of additional functions are also defined in the control facility 2. A consumption profile of the domestic appliance 1 is stored in the control facility 2 for every operating program, describing consumption of the operating resource—in particular electrical energy—by the domestic appliance 1 for application of the respective operating program as a function of time t. An exemplary consumption profile VP is shown in FIG. 3. Operation starts at a time point t0 and ends at a time point t1. The time period of operation here is T5. A time period between an instantaneous time point tA and the time point t0, in other words the time period until the start of operation is designated as T6. It should be noted here that a different consumption profile VP can be defined for every stored operating program. The respective consumption profile VP can also be adapted dynamically, when the operator selects an additional function such as "Prewash", "Extra rinse" or "Stains".

The control facility 2 can now "overlay" the two profiles, specifically the cost profile KP and the consumption profile VP. The control facility 2 can compare the duration of the respective times intervals T2, T4 with low electrical energy costs with the time period T5 of operation. If the control facility 2 determines that the time period T5 is longer than the duration of time interval T2 or time interval T4, it determines the time point t0 for the start of operation, so that on the one hand costs are at their lowest and on the other hand operation is started as early as possible, in other words the time period T6 is at its shortest.

Possible operation of the domestic appliance 1 can take place as follows:
The operator switches on the domestic appliance 1 and selects a specified operating program and possibly also additional functions. The control facility 2 receives this input. The control facility 2 selects the assigned consumption profile VP for the selected operating program from a storage unit and adapts this consumption profile VP as required as a function of the selected additional functions. If for example a consumption profile VP as shown in FIG. 3 is defined, the control facility 2 determines that this consumption profile VP includes a total of three program segments with relatively high electrical energy consumption. The consumption profile VP according to FIG. 3 also includes a first power intensive program segment 6, which starts immediately after the time point t0. The consumption profile VP also includes two further program segments 7, 8 which are also power intensive. However these program segments 7, 8 only start during the later course of operation. The control facility 2 determines the instantaneous or current time or the current time point tA. The control facility 2 now determines that a total of two time intervals T2 and T4 with low electrical energy costs are imminent. The control facility 2 interprets the first possible time interval in which costs are lower than the threshold value KPS as a suitable time interval. In the present example this is the time interval T2. The control facility 2 also determines that the time period T5 of operation is longer than the duration of time interval T2. The control facility 2 determines the time point to for the start of operation so that most of the program segments 7, 8 with higher energy consumption than other program segments fall within the time interval T2. One criterion for determining the time point to for the start of operation can be that the maximum possible electrical energy or the maximum possible quantity of the operating resource is consumed during the time interval T2. The costs of this operating resource are therefore also at their lowest. A criterion can also be defined for the time period T6 up to time point t0: the time point to can be determined so that the time period T6 does not exceed a predetermined limit value.

The control facility 2 therefore determines the time point t0 for the start of operation of the domestic appliance 1. The control facility 2 can now either start operation automatically at the specified time point t0, specifically without user intervention, or the control facility 2 can output the time point t0 as a proposal with the aid of the operating panel 5. The operator can then decide whether to accept this proposal or to define a different time point. The operator can do this by switching between two different operating modes of the domestic appliance 1 with the aid of the operating panel 5. In a first mode operation is started without user intervention, in other words automatically by the control facility 2 at the set time point t0. In a second mode the proposal can be output.

A further possibility is for the operator to use the operating panel 5 to define the start point t0 or an end point for operation by way of a time preselection function and for the control facility 2 to generate an acoustic and/or optical output. This output informs the operator whether or not the selected start point t0 or the end point is favorable in respect of the cited criteria relating to costs and/or the time period T6.

If the time period T5 of operation is longer than the duration of the time interval T2, the control facility 2 can also propose an alternative operating program, specifically with the aid of the operating panel 5. This can take place in such a manner that an alternative operating program is stored in the control facility 2 for every operating program, specifically a turbo operating program. This turbo operating program is shorter than the assigned standard operating program and can in some instances also be more energy intensive. This means that at least a predominant proportion of operating time falls within the time interval T2. The turbo operating program can also only be proposed on condition that the time interval T2 is longer than a predetermined limit value.

If the time interval T2 does not start within a predetermined time period from the instantaneous time point t0 and/or if its duration is longer than the limit value, the control facility 2 can also propose a further alternative operating program, specifically an ECO operating program, and the time point t0 for the start of operation can also be a long time before the start of the time interval T2. An alternative ECO program can also be stored in the control facility 2 for every operating program, consuming less energy than the standard operating program and in some instances also taking longer. In the example of the consumption profile VP shown in FIG. 3 the program segment 6 can be replaced for example with a program segment which takes longer but consumes much less energy. The time point t0 for the start of operation can then be brought forward in time. It is thus possible on the one hand to save electrical energy and on the other hand to relieve the load on the electrical power supply system.

As mentioned above the control facility 2 receives data containing information about the cost profile KP by way of the communication interface 4. The control facility 2 can receive such data from an external control device 9 or one that is separate from the domestic appliance 1, for example a so-called smart meter. The control device 2 can be coupled to the domestic appliance 1 for example by way of a communication bus (for example power line communication). Alternatively the data can also be transmitted by way of a wireless communication channel.

The control device can also be part of the cited apparatus according to one embodiment of the invention.

The control device 9 is coupled to a computation facility of an energy supplier and can exchange data with this external computation facility. The control device 9 receives the data relating to the cost profile KP from this computation facility of the energy provider and forwards it to the domestic appliance 1.

In a further exemplary embodiment provision is made for the control device 9 also to control the operation of the domestic appliance 1; the control device 9 can take over the function of determining the time point t0 for the start of operation. The control facility 2 of the domestic appliance 1 can then transmit data to the control device 9, said data containing information about the consumption profile VP. This has the advantage that the control device 9 can also take into account data from other domestic appliances when determining the time point t0 for the start of operation. The control device 9 can also be integrated in the domestic appliance 1 or the functions of the control device 9 can be taken over by the control facility 2.

Figure 4:
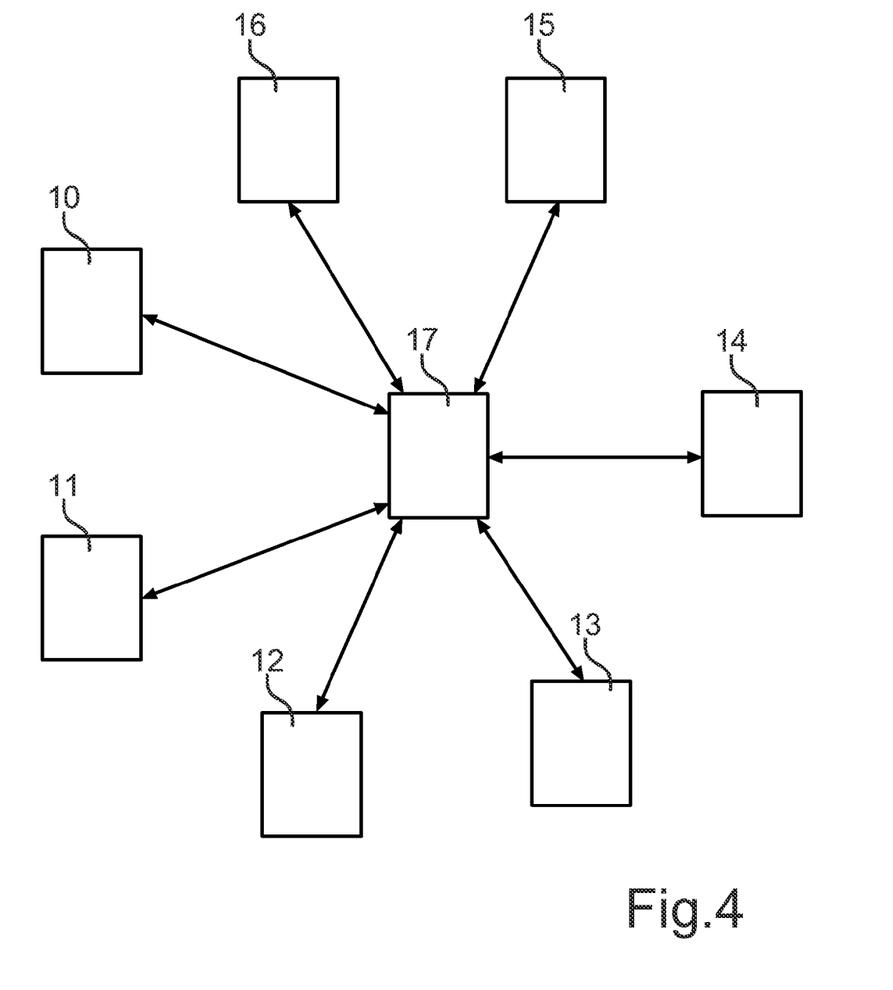
FIG. 4 shows a schematic diagram of a system having an apparatus according to one embodiment of the invention.

FIG. 4 shows a system according to one embodiment of the invention. It includes a plurality of domestic appliances 10 to 16, as well as an external control device 17, for instance the cited smart meter. The control device 17 is an apparatus according to one embodiment of the invention. The control device 17 is a control device that is shared by all the domestic appliances 10 to 16. The system according to FIG. 4 is a smart power supply system; the domestic appliances 10 to 16 can be appliances of a single household or they can be appliances of a larger power system segment. The control device 17 controls the operation of the respective domestic appliances 10 to 16. The control device 17 also receives data from an energy provider, said data containing information about the cost profile KP. The control device 17 also receives data containing information about the respective consumption profiles VP from the respective domestic appliances 10 to 16. The control device 17 can determine the respective time point t0 for the start of operation of the domestic appliances 10 to 16, specifically as set out above. The control device 17 can also take further criteria into account here; for example the respective time point t0 can be set so that a predetermined limit value for the instantaneous electrical power is not exceeded.

The domestic appliances 10 to 16 can also adapt the respective consumption profiles VP during operation and transmit the adapted consumption profiles to the control device 17. This can be done in such a manner that a washing machine performs a load identification and then corrects the duration of a heating phase as a function of the load. The control device 17 can take this corrected consumption profile VP into account when controlling further domestic appliances 10 to 16.

The control device 17 can also be integrated in one of the domestic appliances 10 to 16.

The invention claimed is:

1. A method for operating a domestic appliance, comprising:
  receiving data associated with at least one operating resource, the data containing information about a temporal cost profile of the at least one operating resource, with the temporal cost profile having at least a first time interval with low costs and a second time interval with high costs for the at least one operating resource,
  comparing a time period of operating the domestic appliance, according to a temporal consumption profile, with the first time interval, the temporal consumption profile including a plurality of temporal program segments describing consumption of the at least one operating resource by the domestic appliance as a function of time during operation,
  upon determining that the time period of operation of the domestic appliance according to the temporal consumption profile is longer than the first time interval, determining a plurality of temporal program segments in the temporal consumption profile with a higher consumption of the at least one operating resource than other program segments in the temporal consumption profile, and
  determining a point in time for starting operation of the domestic appliance according to the temporal consumption profile to maximize placement of the determined plurality of program segments with the higher consumption of the at least one operating resource within the first time interval.

2. The method of claim 1, wherein the at least one operating resource comprises at least one of electrical energy and water.

3. The method of claim 1, wherein the point in time for starting operation is determined by an internal control unit of the domestic appliance.

4. The method of claim 1, wherein the point in time for starting operation is determined by a control unit that is separate from the domestic appliance, with the separate control unit transmitting data containing information about the point in time to the domestic appliance.

5. The method of claim 1, wherein the point in time for starting operation is outputted by an output facility as a proposed point in time for starting operation.

6. The method of claim 1, wherein the operation is started automatically at the determined point in time by a control unit.

7. The method of claim 1, wherein the point in time for the starting the operation is determined according to predetermined criteria, with the predetermined criteria relating to costs of the at least one operating resource during the operation and to a time period between a current point in time and the start of operation.

8. The method of claim 1, further comprising:
  receiving an input entered at an operating device and used to select an operating program for operation, and
  when the time period of operation is longer than the first time interval, proposing another operating program having a time period that is shorter than that of the selected operating program.

9. The method of claim 1, further comprising:
  receiving an input entered at an operating device and used to select an operating program for operation, and
  when the first time interval does not start within a predetermined time period from the current point in time or the first time interval is shorter than a limit value, or both, proposing another operating program with a reduced consumption of the at least one operating resource compared to the selected operating program.

10. The method of claim 1, wherein the domestic appliance transmits to an external control unit at least one of:
  data containing information about the temporal consumption profile of the domestic appliance,
  data containing information about the point in time for starting operation, and
  data containing information about a time period of operation.

11. The method according to claim 1, wherein the determined point in time for starting the operation is presented to an operator of the appliance and the operator is presented with an option of accepting the determined point in time for starting the operation or not accepting the determined point of time and instead activating the appliance immediately or at a manually selected time.

12. An apparatus for operating a domestic appliance, comprising:
  a control device for receiving data containing information about a temporal cost profile of an operating resource, with the temporal cost profile having at least a first time interval with low costs and a second time interval with high costs for the operating resource,
  wherein the control device is configured to:

compare a time period of operation of the domestic appliance, according to a temporal consumption profile, with the first time interval, the temporal consumption profile including a plurality of temporal program segments describing consumption of the at least one operating resource by the domestic appliance as a function of time during operation, upon determining that the time period of operation of the domestic appliance according to the temporal consumption profile is longer than the first time interval, determine a plurality of temporal program segments in the temporal consumption profile with a higher consumption of the at least one operating resource than other program segments in the temporal consumption profile, and determine a point in time for starting operation of the domestic appliance according to the temporal consumption profile to maximize placement of the determined plurality of program segments with the higher consumption of the at least one operating resource within the first time interval.

13. The apparatus according to claim 12, wherein the control device is further configured to:
present the determined point in time for starting the operation to an operator of the appliance, and
present the operator with an option of accepting the determined point in time for starting the operation or not accepting the determined point of time and instead activating the appliance immediately or at a manually selected time.

14. The apparatus according to claim 12, wherein the temporal consumption profile includes a plurality of temporal program segments having consumption of the at least one operating resource that is lower than the high consumption of the at least one operating resource of the determined plurality of program segments.

15. The apparatus according to claim 12, wherein the temporal consumption profile includes a plurality of temporal program segments having consumption of the at least one operating resource that is lower than the high consumption of the at least one operating resource of the determined plurality of program segments.

16. The apparatus according to claim 12, wherein the point in time for starting the operation of the domestic appliance according to the temporal consumption profile is determined such that the point in time for starting the operation of the domestic appliance falls outside of the first time interval and at least one other temporal program segments with a consumption of the at least one operating resource that is equal to the consumption of the at least one operating resource of at least one of the determined plurality of program segments falls outside of the first time interval.

17. A domestic appliance comprising an apparatus for operating the domestic appliance, the apparatus comprising:
a control device for receiving data containing information about a temporal cost profile of an operating resource, with the temporal cost profile having at least a first time interval with low costs and a second time interval with high costs for the operating resource,
wherein the control device is configured to:
compare a time period of operation of the domestic appliance, according to a temporal consumption profile, with the first time interval, the temporal consumption profile including a plurality of temporal program segments describing consumption of the at least one operating resource by the domestic appliance as a function of time during operation,
upon determining that the time period of operation of the domestic appliance according to the temporal consumption profile is longer than the first time interval, determine a plurality of temporal program segments in the temporal consumption profile with a higher consumption of the at least one operating resource than other program segments in the temporal consumption profile, and
determine a point in time for starting operation of the domestic appliance according to the temporal consumption profile to maximize placement of the determined plurality of program segments with the higher consumption of the at least one operating resource within the first time interval.

18. The domestic appliance comprising an apparatus for operating the domestic appliance according to claim 17, the control device of the apparatus being further configured to:
present the determined point in time for starting the operation to an operator of the appliance, and
present the operator with an option of accepting the determined point in time for starting the operation or not accepting the determined point of time and instead activating the appliance immediately or at a manually selected time.

19. The domestic appliance according to claim 17, further comprising memory storing a plurality of operating programs, each operating program including a respective temporal consumption profile with a plurality of temporal program segments describing consumption of the at least one operating resource by the domestic appliance as a function of time during operation.

20. The domestic appliance according to claim 19, wherein the control device is further configured to: receive an input selecting one of the plurality of operating programs stored in the memory for operating the domestic appliance.

* * * * *